Oct. 18, 1927.  1,646,366

F. S. CARR

NUT FASTENING

Filed July 22, 1925

Inventor:
Fred S. Carr,
by Emery Booth Janney Varney
Attys.

Patented Oct. 18, 1927.

1,646,366

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

NUT FASTENING.

Application filed July 22, 1925. Serial No. 45,263.

This invention aims to provide an improved lock-nut fastening device.

In the drawings, which illustrate a preferred embodiment of my invention:—

Figure 1:
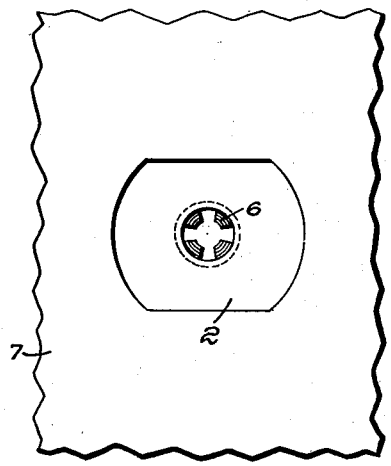
Figure 1 is a front elevation of the locknut positioned in a recess formed in a support.
Figure 2:
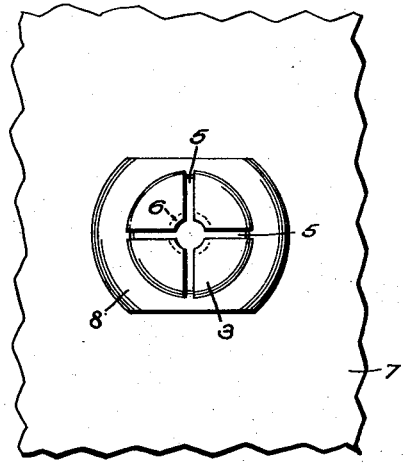
Fig. 2 is a rear elevation of the lock-nut and support.

Referring to the drawings, I have shown a resilient lock nut for use in connection with securing fixtures to a supporting part. The nut may be easily and quickly secured to the supporting part and is initially held in assembly therewith by its own resiliency. This type of nut is particularly, though not exclusively, useful in automobile body construction where locks, hinges, and the like are to be secured to metal parts of the body. It is very useful in parts of the body where the back face thereof is inaccessible after the part to be secured to the body is placed in position.

For illustrative purposes only, I have shown an installation which includes two sheet metal parts or supports, the resilient nut and a screw.

Figure 5:
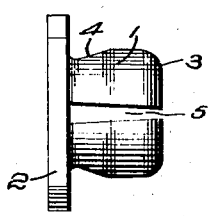
Fig. 5 is a side elevation of the lock-nut.

The nut 1 is formed from a single piece of metal and presents a base portion 2 from which extends a head 3 and a neck portion 4 provided with slots 5 extending from the head 3 to the base 2. Thus I have provided a contractible and expansible head and neck portion. The nut is also provided with a threaded tapered hole 6 extending through the axis thereof as shown in Fig. 5.

Figure 6:
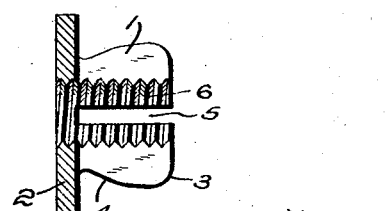
Fig. 6 is a section of the nut before the portions of the head have been pressed together.

During manufacture of the nut, the threaded hole 6 is first formed as shown in Fig. 6 and the head 3 is thereafter bumped so that the hole 6 is made smaller toward the outer end of the head, the purposes of which will be more fully hereinafter described.

The nut support 7 is shown as a piece of sheet metal provided with a recessed portion 8, extending inwardly from the outer face thereof and having an aperture 9 at the bottom thereof. The aperture 9 is of relatively smaller cross-sectional area than the cross-sectional area of the head of the nut, thereby making it necessary for the head of the nut to contract to enable it to pass the wall surrounding the aperture 9.

When the nut has been snapped into engagement with the wall surrounding the aperture 9 (Fig. 3), the base 2 of the nut fits into the recess 8. Both the recess and the nut have cooperating straight sides (Fig. 1), which prevent rotation of the nut relative to the support 7 when a screw is being engaged therewith.

Figure 4:
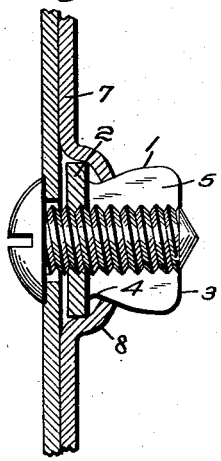
Fig. 4 is a section showing the parts illustrated in Fig. 3 after complete assembly thereof.

The screw 10 is illustrated as securing a relatively thin sheet metal part 11 to the support 7, but may secure any desired object thereto in substantially the same manner. In securing the parts together, the screw 10 is inserted in the hole 6 in the nut and turned relative thereto, thereby drawing the part 11 against the support 7. During the screw-engaging operation, the head 3 of the nut is expanded, by the action of the screw 10 entering the tapered hole 6, until it firmly grips the wall surrounding the aperture 9, as best illustrated in Fig. 4. When the nut is forced against the wall of the aperture 9, by threading the screw into the nut, an effective gripping action will take place between the threads of the screw and the threads of the nut to provide an interlock which will prevent the screw from becoming accidently loosened when the installation (which may be a part of a vehicle) is subjected to vibration.

Figure 3:
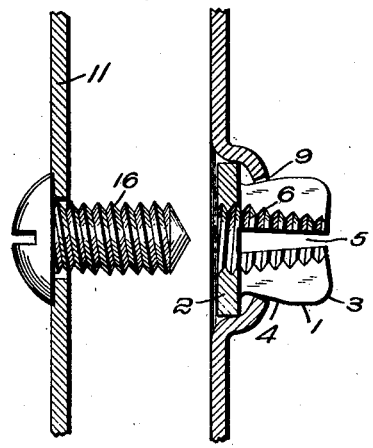
Fig. 3 is a section of the lock-nut and support and a nut-engaging screw and support showing the relation of the parts prior to assembly thereof.

It is important that the slots 5 extend toward the base 3 far enough so that they terminate in a plane beyond the wall against which the nut is expanded as illustrated in Figs. 3 and 4. By locating the slots as just stated, I provide for expansion of the nut in the plane of the wall surrounding the aperture 9, thereby taking up any loose play between the wall and the nut and rigidly securing the part 11 against the support 7. When the parts are secured together, the nut cannot contract and therefore cannot be separated from its support until the screw 10 has been removed from engagement with the nut.

While I have shown and described a preferred embodiment of my invention, it will be understood that changes involving omission, substitution, alteration and reversal of parts, and even changes in the mode of operation, may be made without departing from the scope of my invention, which is best defined in the following claims.

Claims:

1. A nut fastening installation comprising, in combination, a relatively thin support provided with a wall surrounding an aperture therethrough, a nut having a base seated against one side of the support, means cooperating between the nut and support to prevent turning, a resilient wall-engaging portion extending from said base and snapped through the aperture in said support, said resilient portion being contractible and expansible only in a transverse direction relative to the axis of the nut and being longitudinally rigid, and nut-expanding and fastening means adapted to be screwed into engagement with said resilient portion to press it tightly against the wall surrounding the aperture in the support to have interlocking engagement therewith thereby to prevent withdrawal of the nut.

2. A nut fastening installation comprising, in combination, a relatively thin support provided with a wall surrounding an aperture therethrough, a nut having a base portion, means cooperating between the base of the nut and support to prevent turning, a headed portion extending from said base through the aperture in said support, said headed portion being divided by a plurality of slits to permit contraction and expansion only in a direction transverse to the axis of the nut and being longitudinally rigid, said slits extending so as to provide a transversely resilient portion of the nut adjacent to the wall surrounding the aperture in the support, and nut-expanding and fastening means adapted to be screwed into engagement with said resilient portion to press a portion thereof tightly against the wall surrounding the aperture, thereby to prevent withdrawal of the nut.

3. A nut fastening installation comprising, in combination, a support having an aperture passing therethrough, a nut having a base nonrotatably secured to said support, a head and a neck portion extending from said base, said head being snapped through the aperture in said support, a plurality of slots provided in said nut to permit contraction and expansion thereof, a tapered screw-threaded wall surrounding a bore extending through said nut axially thereof and fastening means for threaded engagement with said tapered wall for expanding and back-supporting the slotted portion of said nut and for securing a part to said support.

4. A nut fastening installation comprising, in combination, a support presenting an aperture therethrough, a nut having a longitudinally threaded bore of substantial length, and presenting a head contractible when passing through said aperture and expansible thereafter for engagement with the wall surrounding said aperture, said head being resilient only in a direction transverse to the axis of the nut and being longitudinally rigid, and a nut-engaging part passing through and engaging a part to be secured to said support for cooperative threaded engagement with said nut by turning of the nut-engaging part relative to the nut, thereby to expand the nut in said aperture and to prevent contraction thereof and to prevent separation of said nut from said support when stress is exerted upon the parts secured together by said nut and nut-engaging part.

5. A fastener installation comprising, in combination, a support, a longitudinally rigid nut having a base portion, a laterally expansible portion snapped into and passing through an aperture in said support and extending a substantial distance beyond the inner face thereof, cooperating interlocking means between the nut and support for preventing rotation of the nut, said nut having a hole extending entirely therethrough and presenting a tapered wall, and a nut expanding and fastening device having means engaging said tapered wall to expand the nut in the aperture in said support, said expanding and fastening device being interlocked with the nut to secure a part to be supported to said support.

6. A threaded nut for bolt fastened installations formed from a single piece of solid stock and comprising a rigid portion, a resilient portion extending from said rigid portion to provide a head and neck portion for resiliently holding said nut to a support prior to engagement by a screw, said head being located at one end of said nut and being resilient only in a direction transverse to the axis of the nut and being longitudinally rigid, a threaded wall of substantial length surrounding a bore entirely through said nut into which a screw may be threaded to expand the nut and to back-support and prevent contraction of said resilient portion and prevent accidental separation of the nut from the support and means to prevent the nut from turning on the support.

7. A threaded nut for bolt fastened installations comprising a rigid base portion, a resilient portion extending from said rigid portion to provide a head and a neck portion for resiliently holding said nut to a support prior to engagement by a screw, said resilient portion being resilient only in a direction transverse to the axis of the nut and being longitudinally rigid, and a tapered threaded wall surrounding a bore through said nut with which a screw may be engaged to expand said resilient portion beyond its normal expansion, thereby to lock the nut to a support.

In testimony whereof, I have signed my name to this specification.

FRED S. CARR.